US008645740B2

(12) United States Patent
de Cesare et al.

(10) Patent No.: US 8,645,740 B2
(45) Date of Patent: Feb. 4, 2014

(54) METHODS AND SYSTEMS TO DYNAMICALLY MANAGE PERFORMANCE STATES IN A DATA PROCESSING SYSTEM

(75) Inventors: Joshua de Cesare, Campbell, CA (US); Keith Alan Cox, Campbell, CA (US); Nathaniel Begeman, Cupertino, CA (US); Jerry Hauck, Windemere, FL (US)

(73) Assignee: Apple Inc., Cupertino, CA (US)

( * ) Notice: Subject to any disclaimer, the term of this patent is extended or adjusted under 35 U.S.C. 154(b) by 1612 days.

(21) Appl. No.: 11/811,155

(22) Filed: Jun. 8, 2007

(65) Prior Publication Data

US 2008/0307245 A1    Dec. 11, 2008

(51) Int. Cl.
*G06F 1/32*    (2006.01)
(52) U.S. Cl.
USPC .......................................... 713/340
(58) Field of Classification Search
USPC ................................ 713/300, 340
See application file for complete search history.

(56) References Cited

U.S. PATENT DOCUMENTS

| 5,768,599 | A | 6/1998 | Yokomizo |
| 6,002,436 | A | 12/1999 | Anderson |
| 6,016,548 | A | 1/2000 | Nakamura et al. |
| 6,115,776 | A | 9/2000 | Reid et al. |
| 6,360,327 | B1 | 3/2002 | Hobson |
| 6,434,708 | B1 | 8/2002 | Dunnihoo et al. |
| 6,442,700 | B1 * | 8/2002 | Cooper ......................... 713/320 |
| 6,473,607 | B1 | 10/2002 | Shohara et al. |
| 6,477,654 | B1 | 11/2002 | Dean et al. |
| 6,574,740 | B1 * | 6/2003 | Odaohhara et al. ........... 713/323 |
| 6,625,740 | B1 | 9/2003 | Datar et al. |
| 6,633,942 | B1 | 10/2003 | Balasubramanian |
| 6,795,781 | B2 | 9/2004 | Aldridge et al. |
| 6,816,750 | B1 | 11/2004 | Klaas |
| 7,039,819 | B1 | 5/2006 | Kommrusch et al. |
| 7,124,225 | B2 | 10/2006 | Yao |
| 7,165,134 | B1 | 1/2007 | Kardach |
| 7,254,721 | B1 * | 8/2007 | Tobias et al. .................. 713/300 |
| 7,529,958 | B2 | 5/2009 | Roth et al. |
| 7,539,880 | B2 * | 5/2009 | Mentzer et al. ............... 713/300 |
| 7,562,234 | B2 * | 7/2009 | Conroy et al. ................ 713/300 |

(Continued)

FOREIGN PATENT DOCUMENTS

| EP | 1 164 460 A1 | 12/2001 |
| EP | 1 282 030 A1 | 2/2003 |

(Continued)

OTHER PUBLICATIONS

ARM Limited, "ARM Architecture Reference Manual", 2005, pp. i through A2-70, Cambridge, England.

*Primary Examiner* — Kim Huynh
*Assistant Examiner* — Eric Chang
(74) *Attorney, Agent, or Firm* — Blakely, Sokoloff, Taylor & Zafman LLP

(57) ABSTRACT

Methods and apparatuses to dynamically manage a performance state of a data processing system are described. The data processing system includes a plurality of components; one or more buses coupled to the plurality of components, and a dynamic performance state manager unit coupled to the components. The dynamic performance state manager unit is configured to receive information about a first plurality of current states of components of the system. The dynamic performance state manager unit is configured to determine a second plurality of required system performance states for the components; and to determine a current system performance state based on the first plurality and the second plurality.

34 Claims, 8 Drawing Sheets

(56) References Cited

U.S. PATENT DOCUMENTS

| | | |
|---|---|---|
| 2002/0112193 A1 | 8/2002 | Altman et al. |
| 2002/0135398 A1 | 9/2002 | Choi et al. |
| 2003/0095096 A1 | 5/2003 | Robbin et al. |
| 2003/0126487 A1 | 7/2003 | Soerensen et al. |
| 2003/0196129 A1 | 10/2003 | Lin |
| 2004/0148533 A1 | 7/2004 | Nicholas |
| 2004/0199695 A1 | 10/2004 | Purdham et al. |
| 2004/0224638 A1 | 11/2004 | Fadell et al. |
| 2005/0062502 A1 | 3/2005 | Arakawa |
| 2005/0149769 A1 | 7/2005 | O'Connor et al. |
| 2005/0240786 A1 * | 10/2005 | Ranganathan ............ 713/320 |
| 2006/0031692 A1 | 2/2006 | Kato et al. |
| 2006/0075267 A1 | 4/2006 | Tokue |
| 2006/0156043 A1 | 7/2006 | Liu et al. |
| 2007/0005995 A1 | 1/2007 | Kardach et al. |
| 2007/0043963 A1 | 2/2007 | Cheng et al. |
| 2008/0016380 A1 | 1/2008 | Stufflebeam |
| 2008/0147946 A1 | 6/2008 | Pesavento et al. |
| 2008/0168285 A1 | 7/2008 | de Cesare |

FOREIGN PATENT DOCUMENTS

| | | |
|---|---|---|
| EP | 1 503 271 A2 | 2/2005 |
| EP | 1 645 940 A2 | 4/2006 |
| EP | 1 739 523 A2 | 1/2007 |
| JP | 2001 188628 A | 7/2001 |

* cited by examiner

| | | | | 400 |
|---|---|---|---|---|
| 401 | 402 | 403 | 404 | |
| COMPONENT 1 (E.G., CPU) | 100% | 0 | 0% |
| COMPONENT 2 (E.G., CPU) | 100% | 1 | 100% |
| COMPONENT 3 (E.G., H264) | 100% | 0 | 0% |
| COMPONENT 4 (E.G., LCD) | 50% | 1 | 50% |
| COMPONENT 5 (E.G., AMC) | 25% | 0 | 0% |

FIG. 4

METHODS AND SYSTEMS TO DYNAMICALLY MANAGE PERFORMANCE STATES IN A DATA PROCESSING SYSTEM

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright ©2007, Apple Inc., All Rights Reserved.

FIELD OF THE INVENTION

Embodiments of the invention relate to data processing systems, and more particularly, to managing performance states of the data processing systems.

BACKGROUND

Power management on a data processing system often involves techniques for reducing the consumption of power by components in the data processing system. The data processing system may be a laptop or otherwise portable computer, such as a handheld general purpose computer or a cellular telephone. The management of power consumption in a portable device which is powered by a battery is particularly important because better power management usually results in the ability to use the portable device for a longer period of time when it is powered by one or more batteries.

Conventional systems typically utilize timers to indicate when a subsystem should be turned off after a period of inactivity. For example, the motors in a hard drive storage system are typically turned off after a predetermined period of inactivity of the hard drive system. Similarly, the backlight or other light source of a display system may be turned off in response to user inactivity which exceeds a predetermined period of time. In both cases, the power management technique is based on the use of a timer which determines when the period of inactivity exceeds a selected duration.

In other power managing techniques, the data processing system may be switched between different operating points. An operating point may represent a particular operating voltage and frequency pair. For example, one operating point consumes less power by having the data processing system operate at a lower voltage and also at a lower operating frequency relative to another operating point. In the case of another operating point, the data processing system operates at a higher voltage and a higher operating frequency.

Certain systems provide the capability to switch power completely off (e.g. set the operating voltage at V=0) if no use is being made of a particular subsystem. For example, certain systems on a chip (SOCs) provide a power saving feature which allows for particular subsystems to be turned off completely if they are not being used.

Existing power management techniques typically manage the power based on the theoretical assumptions. The existing power management techniques typically do not take into account the actual states of the system components. Such techniques lack accuracy, reliability, and are unable to efficiently manage the power of the digital processing system.

Some existing power management techniques may manage power of a component using the local information. These techniques typically have control of power only over a single component and do not have control of power over the other components in the system. In such techniques, for example, the power of a central processing unit ("CPU") may be controlled based on the local load of this CPU, while the power of other components of the system, e.g., a graphics processor, remains uncontrolled.

Other existing power management techniques may manage total power supplied to the system based on the total load of the system.

SUMMARY OF THE DESCRIPTION

Embodiments of methods and apparatuses to dynamically manage a performance state of a data processing system are described. The data processing system, in certain embodiments, includes a plurality of components. A current system performance state, which may apply to each of the components in certain embodiments, is determined based on a plurality of current states of components of the system and a plurality of required system performance states for the components. The plurality of current states may include on/off states of the components of the system. The plurality of required system performance states for the components may be determined using performance constraints of the components and a set of performance states that the data processing system supports.

In one embodiment, a performance level of at least one component is adjusted based on the current system performance state. The current system performance state (e.g., a system bus speed and/or other parameters) may apply to each of the components. Adjusting the performance level of the at least one component may include changing a frequency, a bandwidth, a voltage, or any combination thereof. At least one component driver may be notified about a change in the system performance state before adjusting of the performance level, after adjusting of the performance level, or both. In one embodiment, actual performances for the components are determined based on current states of the components of the system and the required system performance states for the components. In one embodiment, the current system performance state is determined using the actual performances for the components. In one embodiment, the system performance state is determined relative to a maximum system performance state.

In one embodiment, the data processing system includes one or more buses coupled to the plurality of components, and a dynamic performance state manager ("DPSM") unit coupled to the one or more components. The DPSM unit may be configured to receive information about current states of each of components of the system or a portion of the system. The DPSM unit may be configured to determine required system performance states for the components. The DPSM unit may be further configured to determine a current system performance state, which may be a state for multiple components (or even globally for all components), based on the current states of components of the system and the required system performance states for the components. The current system performance state may include a system wide parameter, such as a speed (in MHz, for example) of a system wide bus, set for all (or a portion of) the components in the system; in this embodiment, a global parameter is derived from a global decision which may be based on local information (e.g., local information from each subsystem about the processing state or processing requirements/needs for the subsystem). The dynamic performance state manager unit may be further configured to adjust a performance level of at least one component based on the current system performance state. The data processing system may include one or more device drivers coupled to the one or more buses. In one embodiment, the DPSM unit is configured to notify at least one device driver about a change in the performance state of the system.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 4 shows a data structure that is generated by a performance calculator according to one embodiment of the invention.

DETAILED DESCRIPTION

Figure 1:
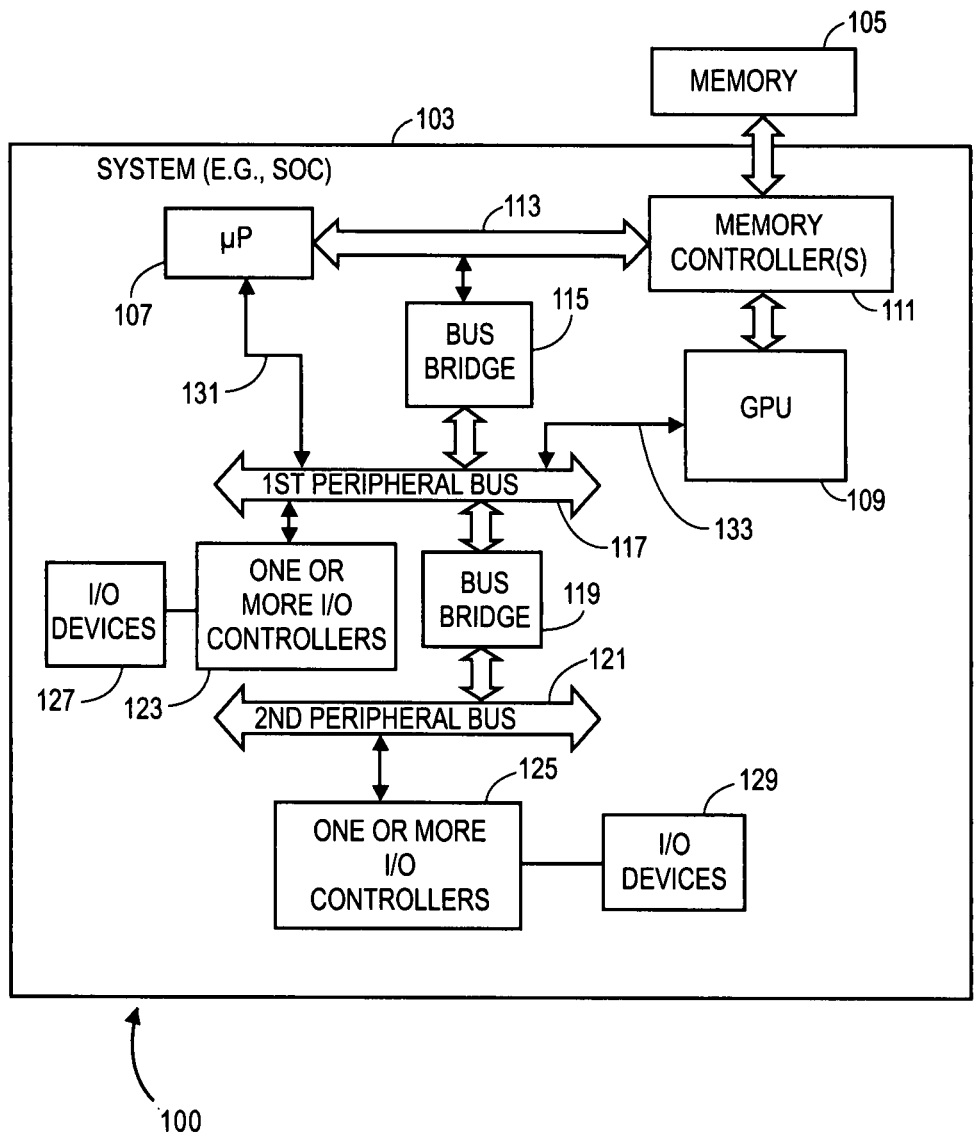
FIG. 1 shows an example of a data processing system that may be used according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of media.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone with a multi-touch input device.

FIG. 1 shows an example of a data processing system that may be used in at least one embodiment of the present invention. Data processing system 100 shown in FIG. 1 includes a memory 105 and a system 103 which may be implemented in at least one embodiment as a system on a chip, which is a monolithic semiconductor substrate which forms an integrated circuit that provides all the components for the system on a single chip. In an alternative embodiment, the various components may be spread over multiple integrated circuits. System 103 includes a microprocessor 107 which is coupled to memory 105 through a bus 113 and a memory controller 111. Memory controller 111 may be multiple memory controllers for controlling different types of memory 105, such as dynamic random access memory (DRAM) (e.g. double-data-rate (DDR) RAM), and flash memory and/or other types or combinations of memory such as a magnetic hard drive, etc. Memory controller 111 is coupled to a graphics processing unit (GPU) 109 which allows GPU 109 to obtain graphics data or store graphics data in memory 105 and to retrieve graphics instructions, for processing by the GPU, from memory 105. It will be understood that GPU 109 is coupled to a display controller (not shown), which in turn is coupled to a display (not shown), such as a color liquid crystal display (CLCD), to drive the display to cause images to appear on the display.

Microprocessor 107, memory controller 111, memory 105, and GPU 109 are coupled to other components of system 103 through peripheral buses 117 and 121 and bus bridges 115 and 119, as shown in FIG. 1. Bus bridge 115 couples bus 113 to a peripheral bus 117, and a bus bridge 119 couples peripheral bus 117 to peripheral bus 121. Microprocessor 107 and GPU 109 are coupled to peripheral buses 117 and 121 through these bus bridges. GPU 109 is also coupled to peripheral bus 117 through a control port for graphics 133, and microprocessor 107 is also coupled to peripheral bus 117 through a peripheral port 131 of microprocessor 107. One or more input/output (I/O) devices may be part of system 100. These I/O devices may be one or more of a plurality of known I/O devices including track pads, touch pads, multi-touch input panels, an audio speaker and an audio microphone, a camera, a dock port, one or more wireless interface controllers, a cursor control device such as a mouse or a joystick or a trackball, one or more keyboards, one or more network interface adapters (e.g. an Ethernet interface port), etc. If system 103 is implemented as a system on a chip, then the I/O devices 127 and 129 would typically be a separate component which is not disposed on the integrated circuit. Each of the I/O devices 127 and 129 are coupled through I/O controllers, such as the I/O controllers 123 and the I/O controllers 125 as shown in FIG. 1.

In addition to the I/O devices previously listed, system 103 may include other subsystems (not shown) which may be considered an I/O device, such as an audio codec, a video decoder or a digital signal processor, for example, a video decoder and a digital signal processor (DSP). An embodiment of system 100 shown in FIG. 1 may include a power controller (not shown) and a power management unit (not shown) in order to provide power gating to the various components in the system 103, as described in co-pending U.S. patent application Ser. No. 11/620,703, filed Jan. 7, 2007, which is entitled "Methods And Systems For Power Management In A Data Processing System" and which is owned by the assignee of the instant inventions. This application is incorporated herein by reference in its entirety. In one embodiment, the power gating in system 103 can use a clock enable/disable signal for a component to indicate amount of work to be done.

In one embodiment, system 100 uses a single system clock (not shown) to drive microprocessor 107, GPU 109, memory controllers 111, memory 105, buses 113, 117, and 121, and through peripheral buses 117 and 121, I/O controllers 123 and 125, and I/O devices 127 and 129. Frequency of the system clock, and/or system voltage can determine how much power is used by system 100. The frequency of the system clock and/or system voltage can effectively control how much performance can be obtained from each of the components of the system. If the component operates at faster clock frequency, and/or higher voltage, the component may dissipate more power.

Figure 2:
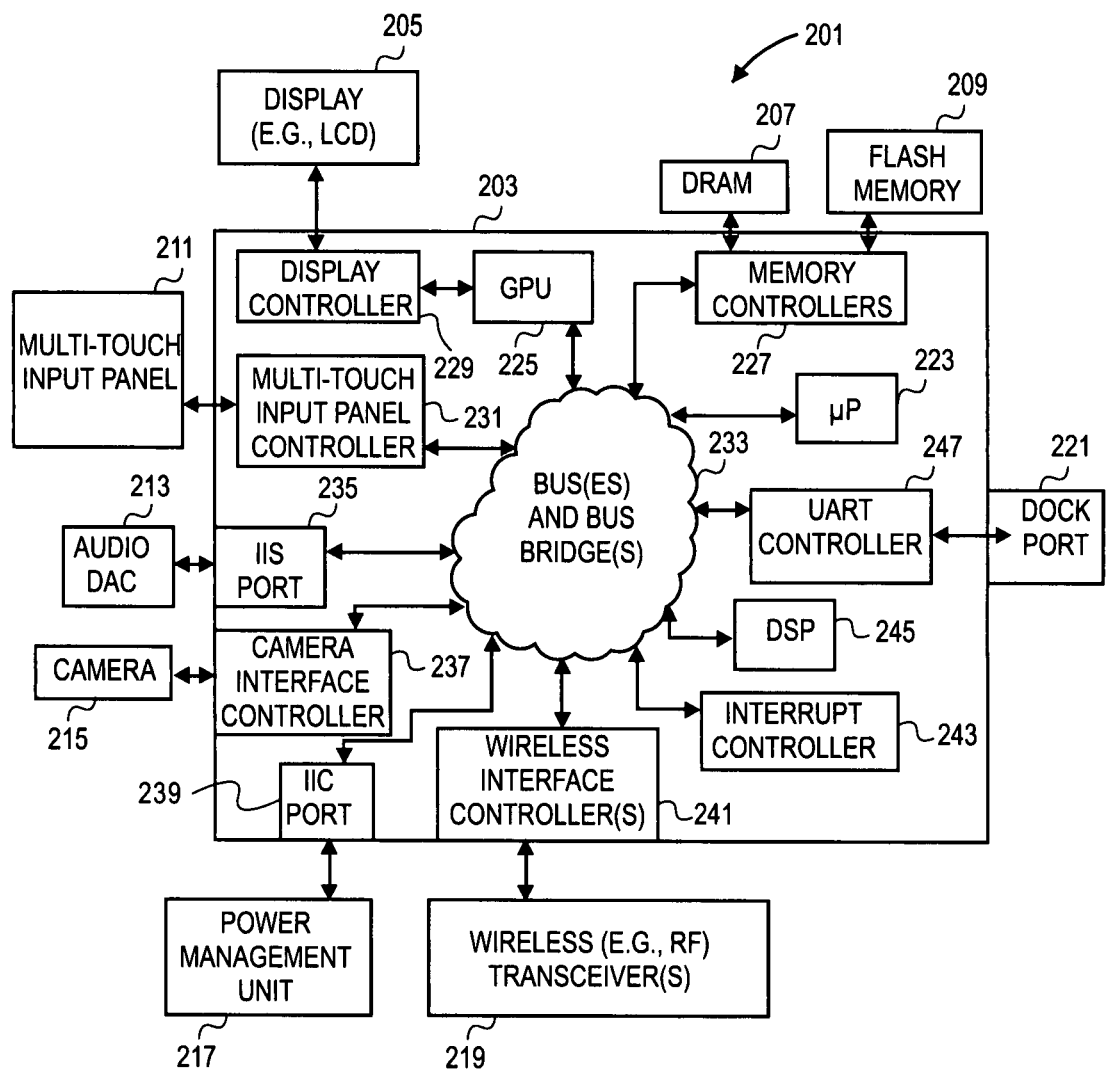
FIG. 2 shows another example of a system which may be used according to another embodiment of the invention.

FIG. 2 shows another example of a system which may be used with one or more of the inventions described herein. A data processing system 201 may implement a system 203 as a system on a chip (SOC) integrated circuit or may implement system 203 as multiple integrated circuits coupled by one or more buses. Data processing system 201 includes a plurality of components in system 203 and components which are shown external to system 203 but which are coupled to system 203 as shown in FIG. 2. Such components include a dynamic random access memory (DRAM) 207, a flash memory 209, both of which are coupled to memory controllers 227, a dock port 221 which is coupled to an universal asynchronous receiver/transmitter (UART) controller 247, a wireless (e.g., RF) transceivers 219 which are coupled to wireless interface controllers 241, a power management unit 217 coupled to an IIC port 239, a camera 215 which is coupled to a camera interface controller 237, an audio digital-to-analog converter (DAC) 213 which is coupled to an IIS port 235, a multi-touch input panel 211 which is coupled to a multi-touch input panel controller 231, and a display device 205 which may be a liquid crystal display device, which is coupled to a display controller 229. These various components provide input and output capabilities for the data processing system as is known in the art.

In addition, system 203 includes components, such as a graphics processing unit (GPU) 225 and a microprocessor 223 which may be, in certain embodiments, an ARM microprocessor. In addition, system 201 may include a digital signal processor 245 and an interrupt controller 243. These various components are coupled together by one or more buses and bus bridges ("bus matrix") 233 which may be implemented in a variety of architectures, such as the bus architecture shown in FIG. 1 or alternative bus architectures. Power management unit 217 may dynamically manage a performance state of data processing system 201, as described in further detail below. Power management unit 217, in conjunction with microprocessor 223, may implement other power management techniques, such as operating at different voltage and frequency operating points as described in above-referenced U.S. patent application Ser. No. 11/620,703. In one embodiment, power management unit 217 is configured to control bus matrix 233 to operate at as low frequency as possible without affecting the performance of the other components of the system, as described in further detail below. In one embodiment, power management unit 217 includes a dynamic performance state manager unit (not shown) that is described in further detail below.

In one embodiment, system 200 uses a single system clock (not shown) to drive components of the system, e.g., microprocessor 223, GPU 225, memory controllers 227, memories 207 and 209, bus matrix 233, and other components of the system. Frequency of the system clock and/or system voltage can determine how much power is used by system 200. In one embodiment, for system 200 to operate properly, bus matrix 233 is always turned "ON". In one embodiment, power management unit 217 controls the components of the system, such that each of the components of the system 200 could operate at as low performance level as possible for the current system performance state, as described in further detail below. As a result, the power of the system 200 is saved without sacrificing the performance level of the other components in the system 200.

While power management unit 217 is shown external to system 203, it may be part of a system on a chip implementation in certain embodiments. At least some of the other components, such as wireless transceivers 219, may also be implemented in certain embodiments as part of a system on a chip. Wireless transceivers 219 may include infrared transceivers as well as radio frequency (RF) transceivers and may include one or more of such transceivers, such as a wireless cellular telephone transceiver, a WiFi compliant transceiver, a WiMax compliant transceiver, a Bluetooth compliant transceiver, and other types of wireless transceivers. In one particular embodiment, wireless transceivers 219 may include a wireless cellular telephone transceiver, a WiFi compliant transceiver (IEEE 802.11 A/G transceiver), and a Bluetooth transceiver. Each of these wireless transceivers may be coupled to a respective wireless interface controller which may be one or more of a plurality of interface controllers, such as a UART controller or an IIS controller or an SDIO controller, etc. Data processing system 201 may include further input/output devices, such as a keypad, or a keyboard, or a cursor control device, or additional output devices, etc.

It will be understood that the data processing system of FIG. 2 may be implemented in a variety of different form factors or enclosures which package and embody the data processing system. For example, the data processing system 201 may be implemented as a desktop computer, a laptop computer, or an embedded system, consumer product or a handheld computer or other handheld device. It may be implemented to operate off of AC power or a combination of AC power and battery power or merely battery power in at least certain modes. The data processing system may include a cellular telephone and may have the form factor of a cellular telephone, such as a candy-bar style cellular telephone or a flip phone or a phone with a sliding keyboard which slides out (e.g., from an enclosure) or swings out (e.g., from an enclosure) to expose the keys of the keyboard.

In certain embodiments, data processing system 201 may be implemented in a tablet format of a small handheld computer which includes wireless cellular telephony and WiFi and Bluetooth wireless capability.

Figure 3:
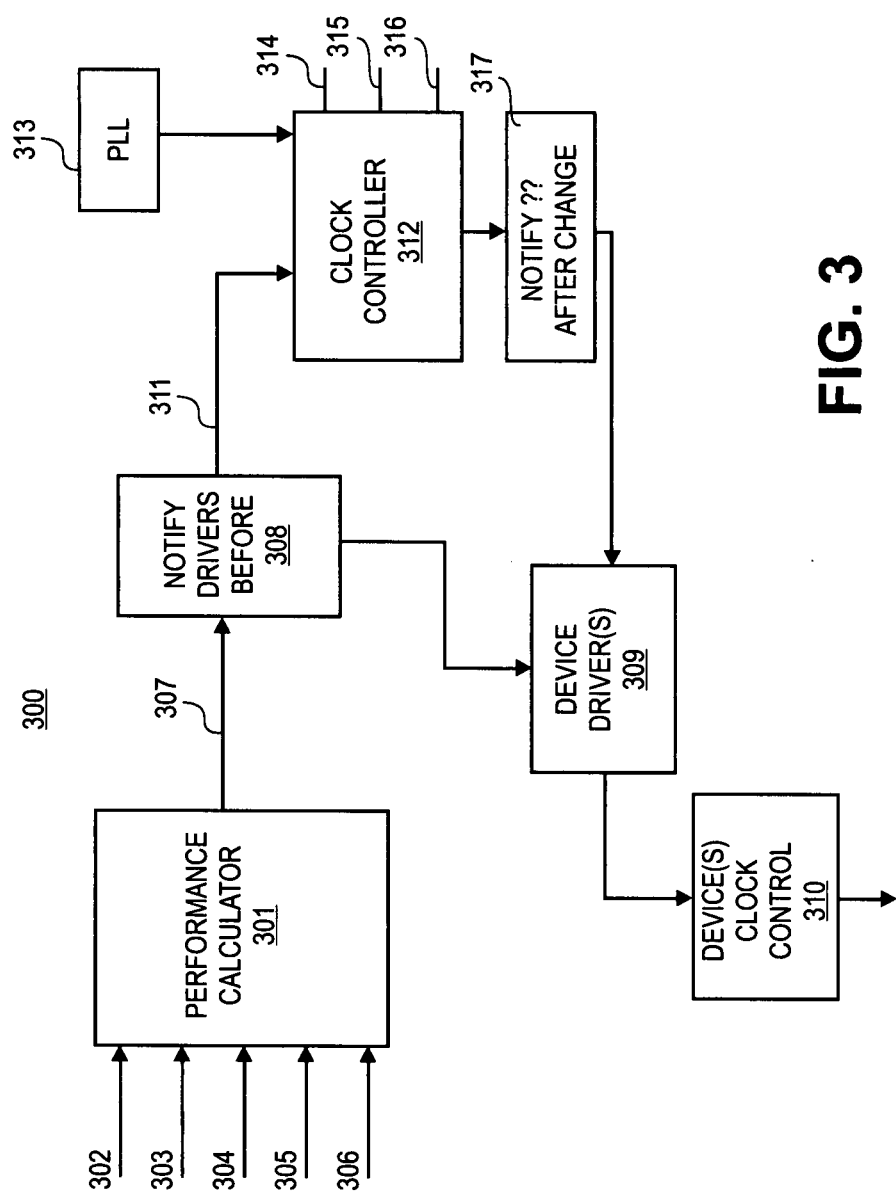
FIG. 3 shows a block-diagram of one embodiment of a dynamic performance state manager to dynamically manage a performance state of a data processing system.

FIG. 3 shows a block-diagram of one embodiment of a dynamic performance state manager (DPSM) 300 to dynamically manage a performance state of a data processing system, e.g., data processing systems 100 and 200, as depicted in FIGS. 1 and 2. The DPSM 300 is configured to save power of the data processing system while ensuring that the components of the system operate at the best performance level for a current task. In one embodiment, DPSM 300 may complement the power gating as described in above-mentioned co-pending U.S. patent application Ser. No. 11/620,703.

DPSM 300 may use, in one embodiment, current local information from reach component of the system to make a global decision for all components that, are controlled by the system clock rate. As shown in FIG. 3, DPSM 300 includes a performance calculator 301 that is configured to receive information about a plurality of current states of components of the system. As shown in FIG. 3, performance calculator 301 has inputs, e.g., inputs 302-306, to receive information about current states of the components of the system. In one embodiment, the information about the current states of the components includes information about current activity of the components (e.g., devices) of the system. This information may be supplied by device drivers (e.g. software) for each component. In one embodiment, the current states of components are "ON" or "OFF" states of the components (or some other measure of activity such as a value between "ON" or "OFF", such as 50% utilization of capacity, etc.). In one embodiment, DPSM unit 300 is configured to receive a current "ON"/"OFF" state of all important devices in the system, for example, CPU, GPU, audio codec, display, video codec, and other devices of the system.

As shown in FIG. 3, inputs of performance calculator 301 receive notifications from components of the system about a current state of the component. In one embodiment, bits "1" or "0" may indicate "ON" or "OFF" state of the component. Input 302 may receive a signal (e.g., bit "0") that indicates that a CPU is currently turned "OFF", input 303 may receive a signal (e.g., bit "1") that indicates that a GPU is currently turned "ON", input 304 may receive a signal (e.g., bit "0") that indicates that an audio codec, e.g., an adaptive modulation and coding (AMC) audio codec device, is currently turned "OFF"; input 305 may receive a signal from a display controller that indicates that a display, e.g., a color liquid crystal display (CLCD), is currently turned "ON", and input 306 may receive a signal that indicates that an H264 video decoder is currently turned "OFF", and so on.

In another embodiment, the current states of components are values indicating, for example, a frequency, a power, a voltage, and any combination thereof that represent the current state of a component.

Figure 6:
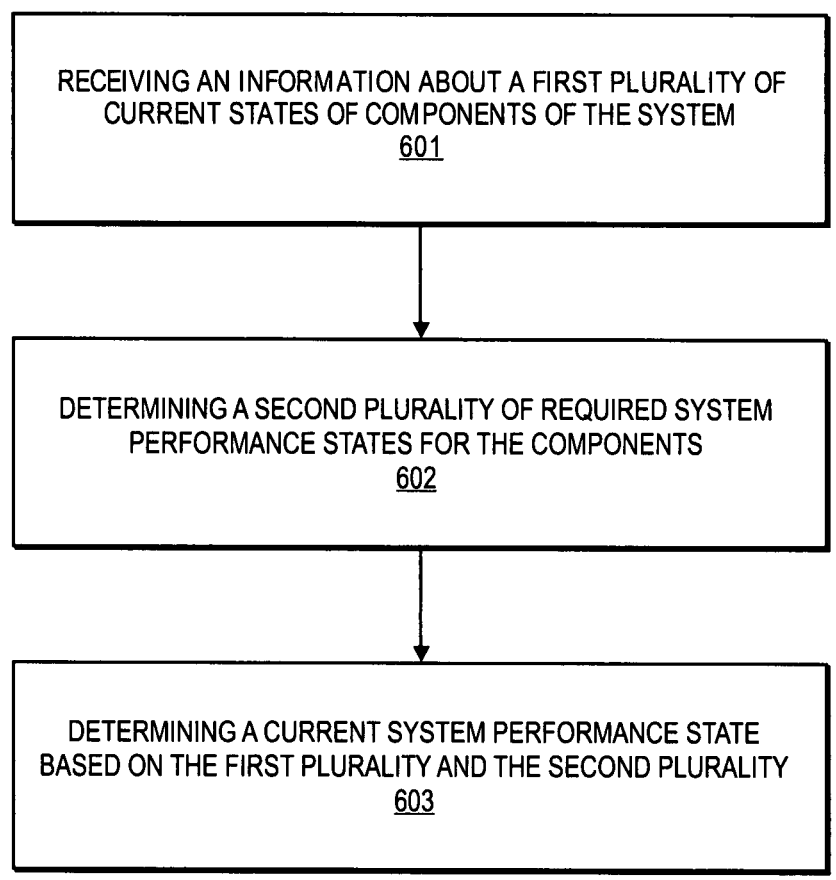
FIG. 6 shows a flowchart of one embodiment of a method to dynamically manage a performance state of a data processing system.

FIG. 6 shows a flowchart of one embodiment of a method to dynamically manage a performance state of a data processing system. As shown in FIG. 6, method 600 begins with operation 601 that involves receiving information about a first plurality of current states of components of the system, as described above with respect to FIG. 3. Method 600 continues with determining a second plurality of required system performance states for the components to operate correctly at operation 602, as shown in FIG. 6. In one embodiment, a required system performance state for a component of the system to operate correctly is a minimum system performance level (state) that is needed for a component to operate most power efficiently. As such, each of the components of the system is provided with the performance state that is not less than the performance state, which the component actually needs to perform its task(s).

Referring back to FIG. 3, DPSM 300 uses a set of the performance states that the data processing system supports, a list of device performance constraints, and a list of current states of operating devices to determine the most power efficient performance level for the system. In one embodiment, DPSM 300 includes a list of clocks required for each component of the system to operate correctly, and determines the minimum system performance level using this list of clocks. In one embodiment, DPSM 300 determines required system performance states for all components of the system that are controlled by a system clock. In one embodiment, DPSM 300 determines the required system performance states for each of the components using performance constraints of the components and a set of performance states that the system supports. In one embodiment, performance calculator 301 includes a function that calculates what minimum system performance level is required for each device of the system to function correctly, for example, most power efficiently. For certain components of the system to function correctly in at least certain embodiments, the minimum system's performance level is required to be substantially fast. For example, when a component of the data processing system, e.g., a microprocessor, memory controller, GPU, graphics controller, video controller, or other component is operating, it needs to operate at a highest system performance level, e.g., as fast as possible to accomplish its task in a shortest possible time, to avoid power "leakage".

For example, memory controllers 227 may be required to operate at a full frequency of a system clock because lowering the frequency of their operation may affect performance of the data processing system. Some components of the data processing system, for example, one or more buses of bus matrix 233, may be required to be always turned "ON" when system 200 is operating. Performance of other components of the system may be more determined by functionality rather than power. For example, a display controller, such as display controller 229, is required to be always turned "ON" when a display, such as display 205, is turned "ON". In one embodiment, the required system performance level for display controller 229 is about 50% that does not sacrifice the performance of the display controller 229.

In one embodiment, an audio codec device operates at a full frequency even when the system performance level is down to about 25%. Typically, at 25 MHz the audio codec device (referred to as "AMC") is faster then real time, but not quite at full speed. The driver for AMC registers for the performance state change notifications. As the system gets slower, it decreases its clock divider to increase its effective clock frequency. If there are multiple performance states that are fast enough, the performance state that is most power efficient for the set of operating devices may be used. In one embodiment, DSPM 300 uses a matrix of clock frequencies for components of the data processing system to set performance states of different components of the system, as described in further detail below. In one embodiment, DSMP 300 can take into account an activity of an application (e.g., synchronizing data on the device with data on another system) and dynamically decide which minimum system performance level to operate. In one embodiment, DPSM 300 obtains a current system performance state based on a current status of the components and most performance needy component, and then adjusts the performance state for substantially every component in the system based on the current system performance state.

FIG. 4 shows one embodiment of a data structure (e.g., a table) that is dynamically generated by performance calculator 301. As shown in FIG. 4, table 400 includes a list of components 1-5, e.g., a CPU, a GPU (Graphics Processing Unit), an H264 video decoder, an LCD, an AMC audio codec, and other devices of the system. As shown in FIG. 4, column 402 contains a required system performance level (state) for each of the components of column 401. In one embodiment, column 402 contains a required minimum system performance level (state) for each of the components of column 401. In one embodiment, the required system performance state is a relative value, e.g., a percentage, of a performance level of the component being controlled. In one embodiment, a required system performance state is determined relative to a maximum system performance state (level). In one embodiment, all the devices of the system have their performance requirements expressed as a percentage of the system's maximum performance.

As shown in FIG. 4, the required system performance state for components 1-3 (e.g., a CPU, GPU, and H264 video) to operate correctly is 100% relative to the maximum system performance level.

As shown in FIG. 4, the required system performance state for component 4 (e.g., an LCD) to operate correctly is 50% relative to the maximum system performance level. As shown in FIG. 4, the required system performance state for component 5 (e.g., an audio codec referred to as "AMC" to operate correctly is 25% relative to the maximum system performance state. In another embodiment, the required system performance state for a component is determined relative to a total bandwidth of the system. For example, the required system performance state for a component can be a percentage of a bandwidth relative to the total bandwidth of the system. In another embodiment, the required system performance state can be an amount of megabytes per second, such as a data processing bandwidth or a data transmitting and/or receiving bandwidth that is required for a component.

Column 403 includes a current state (e.g., ON/OFF state) for each of the components 1-5, as shown in FIG. 4. The current states for each of the components 1-5 can be received through inputs 302-306 shown in FIG. 3. As shown in FIG. 4, components 2 and 4 are "ON" and components 1, 3, and 5 are "OFF".

Referring back to FIG. 6, method 600 continues with operation 603 that involves determining a current system performance level (state) based on the plurality of the current states of the components of the system and the plurality of the required system performance levels (states) for the components. That is, what the performance level of the data processing system should be is determined based on the plurality of the current states of the components and the plurality of required system performance levels (states) for the components.

Referring back to FIG. 4, column 404 contains actual performances for each of the components obtained based on the current states of the components and the required system performance states for the components. In one embodiment, actual performances are calculated by multiplying data of column 402 with data of column 403 for each of components 1-5. As shown in FIG. 4, for component 1, if the current state is "OFF" and required system performance state is 100%, the actual performance is 0%. For component 2 if the current state is "ON" and the required system performance state is 100%, the actual performance is 100%. For component 3, if the current state is "OFF" and the required system performance state is 100%, the actual performance is 0%. For component 4, if the current state is "ON" and the required system performance state is 50%, the actual performance is 50%. For component 3, if the current state is "OFF" and the required system performance state is 25%, the actual performance is 0%. In one embodiment, the current system performance state is calculated using actual performances data from column 404. In one embodiment, the current system performance state is determined by calculating a maximum value of actual performances 404 for each of components. That is, the current system performance state is determined based on the requirement for most performance needy component and the current states of the components. For the example shown in FIG. 4, the current system performance state determined based on actual performances in column 404 is 100%.

Referring back to FIG. 3, performance calculator 301 outputs a current system performance state 307 that is determined based on active states of the components. That is, in certain embodiments, rather than using theoretical assumptions (such as "guessing"), the active states of the components of the system are used to determine a current level of performance for the system while maintaining a minimum performance level to satisfy components' requirements.

Referring back to FIG. 4, when the components 1-4, such as CPU, GPU, LCD, and H264, are turned "OFF", and component 5, such as AMC, is turned "ON", the current system performance state (level) dynamically goes down to 25%. That is, the current system performance level is maintained at a minimum performance level to satisfy performance requirements of the component 5, such as AMC. When any of the components 1, 2, and 3, or any combination thereof, is turned "ON", the current system performance level dynamically increases up to about 100%, to satisfy performance requirements for any of these components. The system may be considered to be dynamic in adjusting the level because it responds to changes in the state of the components. When components 4 and 5 are turned "ON", and components 1-3 are turned "OFF", the current system performance level dynamically decreases down to about 50%, to satisfy the performance requirement of the most performance needy component, e.g., component 5. In one embodiment, the current system performance state is dynamically changed by changing a system clock rate. In another embodiment, the current system performance state is dynamically changed by changing the width of the system bus, such as one or more buses depicted in FIGS. 1 and 2. For example, the width of the system bus may be changed from 16 bits to 32 bits when the current system performance state dynamically increases from about 50% to about 100%.

As shown in FIG. 3, current system performance state 307 is provided to a clock controller 312 that controls a clock of the data processing system, such as systems 100 and 200 depicted in FIGS. 1 and 2 respectively. In one embodiment, DPSM 300 operates transparently to device drivers, so that the device drivers are not aware of the DPSM. In another embodiment, as shown in FIG. 3, performance calculator 301 notifies (block 308) one or more drivers 309 to drive one or more components (e.g., I/O devices) through their respective drivers when the current system performance state 307 changes. I/O devices, such as an audio codec, may operate at a certain fraction of the bus clock. For example, when the current system performance level is about 100%, the audio codec may be driven to operate at the system clock (e.g., bus clock) divided by four. When current system performance level changes, e.g., from 100% to 25%, an audio codec driver is notified to change its divider to divide the system clock by one to maintain the audio codec's clock near its fixed frequency target.

As shown in FIG. 3, one or more drivers 309 are notified (block 308) in one embodiment before adjusting the performance level of the at least one component of the system based on the current performance state 307. In one embodiment, current system performance state 307 is a performance level the data processing system needs to change to. In one embodiment, driver 309 is notified even if the component that is driven by driver 309 is turned "OFF".

In one embodiment, one or more drivers 309 are coupled (through for example software messages between an operating system component and the drivers) to control clock of one or more components (e.g., I/O devices) (not shown). As shown in FIG. 3, performance calculator 301 provides the current system performance state 307 to the system clock controller 312 to adjust a performance level of at least one component, such as a CPU, GPU, memory, bus, and the like. The performance level of the component is adjusted to according to the current system performance state.

In one embodiment, the performance level of the component is adjusted by modifying the frequency of the clock (clock rate). As shown in FIG. 3, clock controller has adjusted clock outputs, such as outputs 314, 135, and 316 that output adjusted clocks to the components, e.g., a CPU, GPU, memory, and bus, and the like. The adjusted clock outputs provide clocks that are adjusted based on the current system performance state 307. For example, output 314 may provide the adjusted clock to the CPU. Output 315 may provide an adjusted refresh rate for the memory of the data processing system. Typically, the refresh rate of the memory is derived from the memory controller's frequency. In one embodiment, one or more dividers (not shown) are used to divide the memory controller's frequency to provide the adjusted refresh rate. While the memory refresh rate may be handled in the code as a special case, it works in the about the same fashion as AMC. In one embodiment, when the current system performance level changes, the divider to provide the refresh rate is changed to maintain the correct memory performance level to ensure that the memory refresh rate does not go too fast and effect performance or too slow and effect stability. In one embodiment, when the current system performance level increases, (e.g., from 25% to 100%) the divider that provides the refresh rate is changed from ¼ to ¹⁄₁ to maintain the efficient memory performance level. As shown in FIG. 3, output 316 may provide a clock that is adjusted based on the current system performance state 307, to one or more buses of the data processing system. In another embodiment, the performance level of the component is adjusted by modifying a bandwidth. In an embodiment, the bandwidth of the bus coupled to the component may be increased or decreased based on the current system performance state.

That is, any component of the data processing system that drives its functional clock from the system clock is effectively configured itself to operate correctly when the current system performance state changes.

As shown in FIG. 3, one or more device drivers 309 are notified, in one embodiment, in block 317 after adjusting clocks 314-316 to drive components of the system. In one embodiment, I/O devices adjust their performance state when they receive notification 317, after one or more clock outputs 314-316 is changed. In one embodiment, notifications 308 and/or 317 allow I/O devices to maintain effectively at a fixed frequency operation, or at least near or under a fixed frequency target, or other constraint.

Figure 5:
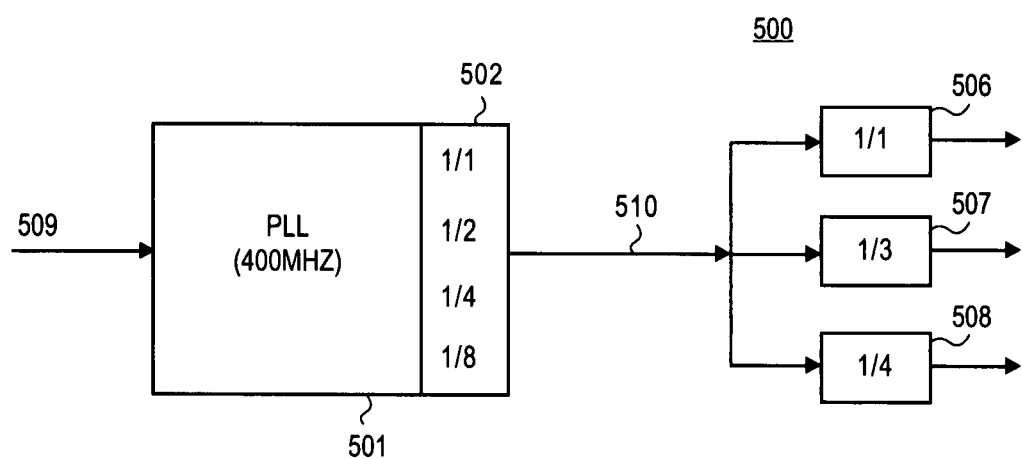
FIG. 5 shows a block-diagram of one embodiment of a clock controller to dynamically control clock of the components of a data processing system.

FIG. 5 shows a block-diagram of one embodiment of a clock controller 500 to dynamically control clock of the components of a data processing system; e.g., data processing systems 100 and 200; as depicted in FIGS. 1 and 2. As shown in FIG. 5, clock controller. includes a programmable phase-locked loop ("PLL") device 501 that is coupled to a plurality of clock outputs, such as outputs 506, 507, and 508, for the components. PLL device 501 includes an output 502 that has dividers, such as dividers /1, /2, /4, /8, to output a current system performance clock 510 that is determined based on a current system performance state 509. As shown in FIG. 5, PLL device 501 generates a system clock, e.g., 400 MHz and outputs the system clock through one of the dividers that can be selected based on current system performance state 509. For example, when current system performance state 509 changes from about 100% to about 50%, PLL device 501 changes the divider of output 502 from ¹⁄₁ to ½, such that the system clock can be dynamically changed from 400 MHz to 200 MHz. In one embodiment, when all components of the system are in "OFF" state, the current system performance state is 12.5%, and PLL device 501 outputs the system clock through an $\frac{1}{8}^{th}$ divider. The current system performance clock 510 is provided to a plurality of component clocks outputs, such as outputs 506-508. Outputs 506-508 provide clocks that are adjusted based on the current system performance state to drive the components of the system; e.g., a CPU, GPU, memory, one or more buses, and the like. In one embodiment, outputs 506-508 include clock dividers, such as dividers $\frac{1}{1}$, $\frac{1}{3}$, $\frac{1}{4}$, and the like to drive the components of the system. In one embodiment, when the current system performance is determined to be about 100% (e.g., 400 MHz), the clock to the CPU provided through $\frac{1}{1}$ divider is about 400 megaherz (MHz), the clock to the memory provided through $\frac{1}{3}$ divider is about 133 MHz, and the clock to the bus is provided through $\frac{1}{4}$ divider is about 100 MHz. In one embodiment, when the current system performance changes from 100% to 50%, the clocks output through dividers 506-508 to the CPU, memory, and bus become 200 MHz, 66 MHz, and 50 MHz respectively. In one embodiment, when the current system performance state increases (e.g., from 50% to 100%), the system clock is divided down by a larger number (e.g., by 4 rather than by 2) to maintain a fixed frequency operation to keep a fixed memory refresh rate. In one embodiment, when the current system performance state increases; e.g., from 50% to 100%, the performance of the components of the system can be leveraged to take advantage of the increased performance. That is, the clocks of the components can be adjusted to take an advantage of the increased system performance state to accomplish their individual tasks quicker.

Figure 7:
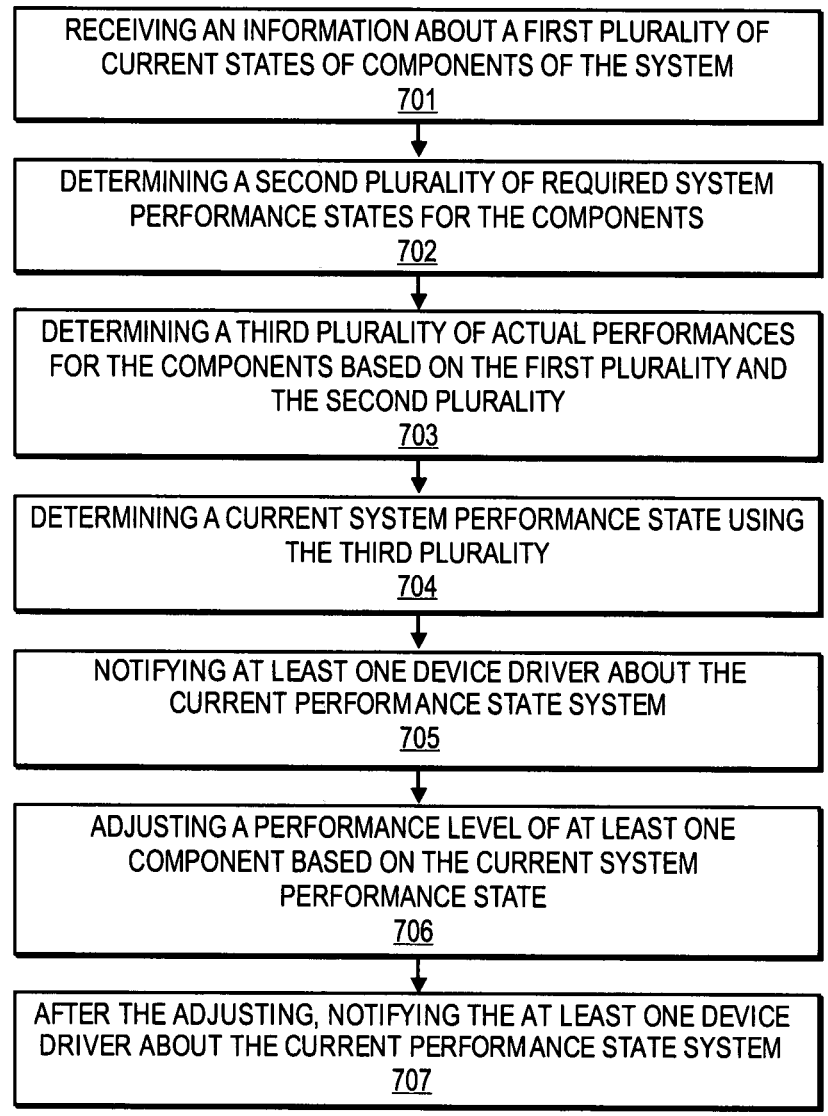
FIG. 7 shows a flowchart of another embodiment of a method to dynamically manage a performance state of a data processing system.

FIG. 7 shows a flowchart of another embodiment of a method to dynamically manage a performance state of a data processing system. Method 700 starts at operation 701 that involves receiving information about a first plurality of current states of components of the data processing system, as described above. Method 700 continues at operation 702 that involves determining a second plurality of required system performance states for the components of the system, as described above. At operation 703, determining a third plurality of actual performances for the components based on the first plurality of current states of the components and the second plurality of the required system performance states is performed as described above. At operation 704 a current system performance state is determined using the third plurality of the actual performances of the components, as described above. Method continues with operation 705 that involves notifying at least one device driver about the current performance state, to adjust the device (e.g., I/O device) if needed. At operation 706 adjusting a performance level of at least one component (e.g., a processor, memory, bus) based on the current system performance state is performed. Next, operation 707 is performed that involves notifying the at least one device driver about the current system performance state after adjusting, as described above.

Figure 8:
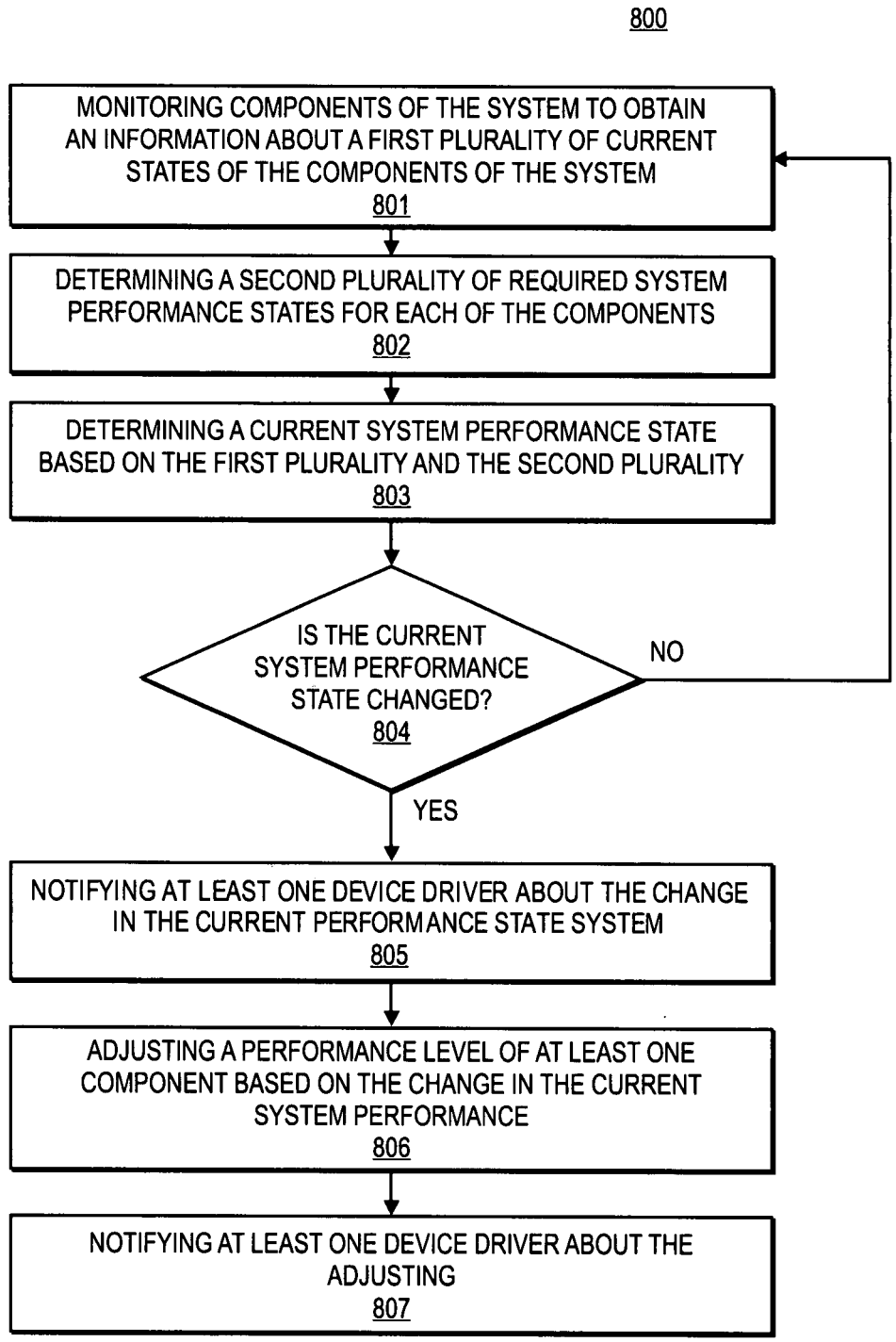
FIG. 8 shows a flowchart of another embodiment of a method to dynamically manage a performance state of a data processing system.

FIG. 8 shows a flowchart of another embodiment of a method to dynamically manage a performance state of a data processing system. Method 800 starts at operation 801 that involves monitoring components of the system to obtain information about a first plurality of current states of the components of the system. In one embodiment, DPSM 300 monitors components of the system by receiving notifications from the components when the current status of the component changes, as described above with respect to FIG. 3.

Method 800 continues with operation 802 that involves determining a second plurality of required system performance states for each of the components of the system, as described above. Next, at operation 803, a current system performance state is determined based on the first plurality of current states of the components and the second plurality of required system performance states. At operation 804 a determination is made if the current system performance state changed. If the current system performance stated has not been changed, method returns to operation 801. If the current system performance state has been changed, operation 805 is performed that involves notifying at least one device driver about the change in the current performance state, to adjust the device (e.g., I/O device) if needed. Next, at operation 806, adjusting a performance level of at least one component (e.g., a processor, memory, bus) is performed based on the change in the current system performance. At operation 807 notifying of at least one device driver about the adjusting the performance level of the at least one component is performed, as described above.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A machine-implemented method to dynamically manage a performance state of a data processing system, comprising:
   determining, relative to a maximum system performance state, a plurality of minimum performance states of the system to operate each of a plurality of components of the data processing system;
   determining which of the components are active;
   determining which of the active components has a highest value of the minimum performance states relative to the maximum system performance state; and
   setting a current system performance state to the highest minimum performance state relative to the maximum system performance state.

2. The machine-implemented method of claim 1, further comprising
   adjusting a performance level of at least one component based on the current system performance state and wherein the current system performance state applies to each of the components.

3. The machine-implemented method of claim 2, wherein the adjusting the performance level includes adjusting a frequency.

4. The machine-implemented method of claim 2, wherein the adjusting the performance level includes adjusting a bandwidth.

5. The machine-implemented method of claim 2, wherein the adjusting the performance level includes adjusting a voltage.

6. The machine-implemented method of claim 1, wherein the determining the plurality of minimum performance states includes determining a minimum system performance state that is needed for a component to operate at a power efficient performance level.

7. The machine-implemented method of claim 1, further comprising
   determining if the current system performance state changed; and
   notifying at least one device driver about a change in the system performance state if the current system performance changed.

8. The machine-implemented method of claim 1, wherein determining which of the components are active includes determining on/off states of the components.

9. The machine-implemented method of claim 1, wherein the plurality of minimum performance states is determined using performance constraints of the components and a set of performance states that the system supports.

10. The machine-implemented method of claim 1, further comprising
determining a plurality of actual performances for the components based on the plurality of minimum performance states and which of the components are active, and wherein the current system performance state is determined using the plurality of actual performances.

11. A data processing system, comprising:
a plurality of components;
one or more buses coupled to the plurality of components; and
a dynamic performance state manager unit coupled to the components, the dynamic performance state manager unit being configured to
determine, relative to a maximum system performance state, a plurality of minimum performance states of the system to operate each of the components;
determine which of the components are active;
determine which of the active components has a highest value of the minimum performance states relative to the maximum system performance state; and
set a current system performance state to the highest minimum performance state relative to the maximum system performance state.

12. The data processing system of claim 11, wherein the dynamic performance state manager unit is further configured to adjust a performance level of at least one component based on the current system performance state and wherein the current system performance state applies to each of the components.

13. The data processing system of claim 12, wherein the adjusting the performance level includes adjusting a frequency and wherein the dynamic performance state manager unit comprises a processor coupled to a memory configured to store software to control the current system performance state.

14. The data processing system of claim 12, wherein the adjusting the performance level includes adjusting a bandwidth.

15. The data processing system of claim 12, wherein the adjusting the performance level includes adjusting a voltage.

16. The data processing system of claim 11, wherein the plurality of minimum performance states includes determining a minimum system performance state that is needed for each component to operate at a power efficient performance level.

17. The data processing system of claim 11, wherein the dynamic performance state manager unit is further configured to
determine if the current system performance state changed; and
notify at least one device driver about a change in the system performance state if the current system performance changed.

18. The data processing system of claim 11, wherein determining which of the components are active includes determining on/off states of the components.

19. The data processing system of claim 11, wherein the plurality of minimum performance states is determined using performance constraints of the components and a set of performance states that the system supports.

20. The data processing system of claim 11, wherein the dynamic performance state manager unit is further configured to determine a plurality of actual performances for the components based on the plurality of minimum performance states and which of the components are active, and wherein the current system performance state is determined using the plurality of actual performances.

21. A non-transitory machine readable medium containing executable program instructions which cause a data processing system to perform operations comprising:
determining, relative to a maximum system performance state, a plurality of minimum performance states of the system to operate each of a plurality of components of the data processing system;
determining which of the components are active;
determining which of the active components has a highest value of the minimum performance states relative to the maximum system performance state; and
setting a current system performance state to the highest minimum performance state relative to the maximum system performance state.

22. The machine readable medium of claim 21 further including data that cause the data processing system to perform operations comprising
adjusting a performance level of at least one component based on the current system performance state and wherein the current system performance state applies to each of the components.

23. The machine readable medium of claim 22, wherein the adjusting the performance level includes adjusting a frequency.

24. The machine readable medium of claim 22, wherein the adjusting the performance level includes adjusting a bandwidth.

25. The machine readable medium of claim 22, wherein the adjusting the performance level includes adjusting a voltage.

26. The machine readable medium of claim 21 wherein the determining the plurality of minimum performance states includes determining a minimum system performance state that is needed for a component to operate at a power efficient performance level.

27. The machine readable medium of claim 21 further including data that cause the data processing system to perform operations comprising
determining if the current system performance state changed; and
notifying at least one device driver about a change in the system performance state if the current system performance changed.

28. The machine readable medium of claim 21, wherein determining which of the components are active includes determining on/off states of the components.

29. The machine readable medium of claim 21, wherein the plurality of minimum performance states is determined using performance constraints of the components and a set of performance states that the system supports.

30. The machine readable medium of claim 21, further including data that cause the machine to perform operations comprising
determining a plurality of actual performances for the components based on the plurality of minimum performance states and which of the components are active, and wherein the current system performance state is determined using the plurality of actual performances.

31. A data processing system comprising:

means for determining, relative to a maximum system performance state, a plurality of minimum performance states of the system to operate each of a plurality of components of the data processing system;

means for determining which of the components are active;

means for determining which of the active components has a highest value of the minimum performance states relative to the maximum system performance state; and means for setting a current system performance state to the highest minimum performance state relative to the maximum system performance state.

32. The system of claim 31, further comprising means for adjusting a performance level of at least one component based on the current system performance state and wherein the current system performance state applies to each of the components.

33. The system of claim 31, further comprising means for determining if the current system performance state changed; and means for notifying at least one device driver about a change in the system performance state if the current system performance changed.

34. The system of claim 31, further comprising means for determining a plurality of actual performances for the components based on the plurality of minimum performance states and which of the components are active, and wherein the current system performance state is determined using the plurality of actual performances.

* * * * *